(12) United States Patent
Lisanke et al.

(10) Patent No.: US 8,458,488 B2
(45) Date of Patent: Jun. 4, 2013

(54) METHOD AND SYSTEM FOR DIAGNOSING OPERATION OF TAMPER-RESISTANT SOFTWARE

(75) Inventors: Michael G. Lisanke, Boynton Beach, FL (US); David Medina, Coral Springs, FL (US)

(73) Assignee: International Business Machines Corporation, Armonk, NY (US)

(*) Notice: Subject to any disclaimer, the term of this patent is extended or adjusted under 35 U.S.C. 154(b) by 2220 days.

(21) Appl. No.: 10/750,517

(22) Filed: Dec. 31, 2003

(65) Prior Publication Data

US 2005/0149750 A1 Jul. 7, 2005

(51) Int. Cl.
*G06F 11/00* (2006.01)
*G06F 12/14* (2006.01)

(52) U.S. Cl.
USPC .......................................................... 713/187

(58) Field of Classification Search
USPC .......................................... 709/232; 713/187
See application file for complete search history.

(56) References Cited

U.S. PATENT DOCUMENTS

| | | | |
|---|---|---|---|
| 5,291,585 A | 3/1994 | Sato et al. | |
| 5,630,069 A | 5/1997 | Flores et al. | |
| 5,828,864 A * | 10/1998 | Danknick et al. | 703/24 |
| 5,893,128 A | 4/1999 | Nauckhoff | |
| 6,115,646 A | 9/2000 | Fiszman et al. | |
| 6,167,533 A | 12/2000 | Potterveld et al. | |
| 6,192,368 B1 | 2/2001 | Gerard et al. | |
| 6,233,587 B1 | 5/2001 | Tandon | |
| 6,256,596 B1 | 7/2001 | Leite, Jr. et al. | |
| 6,366,921 B1 | 4/2002 | Hansen et al. | |
| 6,477,703 B1 | 11/2002 | Smith et al. | |
| 6,549,922 B1 | 4/2003 | Srivastava et al. | |
| 2003/0055809 A1* | 3/2003 | Bhat | 707/1 |
| 2004/0054908 A1* | 3/2004 | Circenis et al. | 713/176 |
| 2005/0246282 A1* | 11/2005 | Naslund et al. | 705/52 |

OTHER PUBLICATIONS

IBM Certification Study Guide AIX V4.3 System Administration, First Edition (May 1999), Section 2.4.1 Using the alog command.*
RFC 2440 OpenPGP Message Format, Nov. 1998.*

* cited by examiner

*Primary Examiner* — Edan Orgad
*Assistant Examiner* — Harris Wang
(74) *Attorney, Agent, or Firm* — Fleit Gibbons Gutman Bongini & Bianco PL; Thomas Grzesik

(57) ABSTRACT

A system and method of providing a way of providing operating information about software which is operating within a protected processing or operating environment. The present invention includes an encrypted trace log which may be of substantially constant size and which is encrypted as it is created. In the event of an error, the trace log may be selectively engaged in response to a signal (e.g., in the event of an error or other anomaly or an operator command) and then removed from the protected processing environment and provided in its encrypted form to a central processing location which possesses the decrypting key. Once the trace log is decrypted, the events may be analyzed to determine if an error has occurred and how to correct it.

18 Claims, 5 Drawing Sheets

METHOD AND SYSTEM FOR DIAGNOSING OPERATION OF TAMPER-RESISTANT SOFTWARE

The present invention is related to the following documents, all of which are assigned to the assignee of the present invention and which are hereby specifically incorporated herein by reference:

U.S. Pat. No. 6,226,618 entitled "Electronic Content Delivery System" issued May 1, 2001 to Edgar Downs et al., which patent describes a digital rights management system for electronic delivery and protection of digital information and is therefore sometimes referred to herein as the DRM Patent.

Patent application Ser. No. 10/437,692 filed May 14, 2003 by Michael G. Lisanke and entitled "Digital Content Control Including Digital Rights Management (DRM) Through Dynamic Instrumentation", sometimes referred to herein as the Instrumentation Patent.

BACKGROUND OF THE INVENTION

1. Field of the Invention

The present invention relates to an improved method and system which allows for the diagnosis or analysis of operation of software within a data processing system which includes a protected operating environment, an environment which is sometimes referred to as a "tamper-resistant" environment or a so-called "protected" processing environment. That is, the present invention allows for analysis of software operation despite the environment having been designed to prevent ordinary tools such as debuggers or tracing tools which could allow for indication of the operation of the software (and without impacting the normal protection of such environment). Preventing or discouraging use of such tools is desirable to protect content and rights in a digital rights management system, for example.

2. Background Art

Many prior art systems exist which deliver content to a processing environment where it is both protected and rendered, e.g., through the use of hardware and/or software of a user's system. Such systems, in general, either do not protect the software and the content being handled from improper analysis or totally prevent diagnosis of operational problems with software by precluding analysis of the software. That is, digital rights management systems such as are shown in the DRM patent rely on the processing environment being protected from tampering or snooping by preventing or restrict the attachment of tracing software and other debugging software. By preventing the attachment of such software, the DRM software makes the system more secure and is sometimes referred to as tamper-resistant environment software or a protected processing environment. In a system such as a DRM system, it is desirable to provide such tamper resistance to protect data used by the system (such as usage rights and secure content) from being observed and/or altered during the data processing of the system, to make it more difficult for the protection of the digital rights management system to be overcome or the content to be obtained without protection.

While the normal operation of a protected data processing system or environment implies that it is unnecessary for any watching of the operation of the software or to trace or debug software, there are situations where the ability to watch the program operation would be desirable. For example, during development and test, it is desirable to know what the program is doing (the steps that are being executed and the results of tests) to make sure the operation is normal and according to specifications. Later, during operation of the program at a user's environment, an apparent abnormality or bug may appear and it would be desirable to know the context of the abnormality—what was the program doing and which part of it was acting improperly. A typical DRM would have a variety of internal different components which could be at fault, ranging from a corruption in the executable code, an incorrect decryption key, incorrect rights or altered content, any one of which could lead to improper execution of a DRM of the type described in the DRM Patent. In addition, a digital rights management system may be loaded on a processing system in which a variety of other programs are resident and may be operating in parallel, causing some possibility of corruption of the system.

Of course, it is possible to design the system with the "tamper-resistance" which is capable of being turned "on" and "off" as desired, in a variety of ways. That is, if situations where it is desirable to watch the program operation, the tamper-resistance features could be temporarily turned "off", or disabled, to allow for monitoring of the operations, either manually by an operator or automatically in response to an anomaly such as an error message. Such a "switch" has the undesirable effect, however, of providing a circumvention method to permit the very tampering which the tamper resistance is designed to prevent and undermine the security of the tamper-resistant environment.

The Instrumentation Patent describes a situation where dynamic instrumentation is permitted in a digital rights management system, and such a system might be used to provide information about the operation of software to permit debugging or analysis of the operation of the software. However, such an instrumentation system may have undesirable effects of reducing the security of the system by allowing instrumentation to provide information on the operation of the digital rights management system to unauthorized personnel and reduce the security of the system.

Thus, the prior art systems have undesirable disadvantages or limitations, and those undesirable limitations either restrict the ability to determine the operation of the system or allow possible attacks of the system, neither of which is desirable.

SUMMARY OF THE INVENTION

The present invention overcomes the disadvantages and limitations of the prior art systems by providing a simple, yet effective, way of providing a protected operating environment while allowing for capture of information for diagnosis or analysis of program operation to discern problems with the software.

The present system also has the advantage of avoiding (or minimizing the risk of) compromising the security of the system that includes the tamper resistance built into that system, through either hardware or software which accomplishes the tamper resistance.

The present invention has the advantage that the operation of software within a protected processing environment may be reviewed and errors detected and corrected.

This error detection and correction may occur without disabling or otherwise removing or circumventing the protection of the protected processing environment. This is desirable since the protected processing environment may be a source of the problem and removing it would change the operating system and possibly remove the source of the errors.

One optional feature of the present invention has the further benefit that the results of monitoring may be selectively engaged, when a problem has occurred or is possible to occur In this way the program which records the processing takes system resources only when diagnostic information is desired and may be turned "off" or disengaged when no monitoring is needed. In this way, the processing of the diagnostic routines do not require processing steps when there is no need for the monitoring.

Another optional feature of the present invention is that the system creates a trace log which is encrypted (preferably as each entry in the log is created) and of fixed size (either relatively or in absolute terms) to protect it from monitoring and the system as a whole from attack. That is, the trace log is file of a fixed size, and the fixed size reduces the chance that its role as a trace log will be apparent from a monitoring of the log and that the events being monitored will be apparent to an attacker, making the trace log and the system as a whole harder to attack. The encryption prevents the contents of the file (trace log) from being read without a decryption key.

The present invention may be operated by "turning on" a trace operation when a log is desired, then recording the inputs and outputs of the system on each activity in a trace log that is encrypted as it is created. The recorded trace log is then sent to a central location where the decryption key is present and the activities in the trace log are decrypted, then analyzed to determine whether each is proper and determining if there was an anomaly and what caused the anomaly.

The present invention also has the advantage that the times of message logging, the amounts of data logged and the content of messages logged are all obscured from the user of the system on which the logging is done. This has the advantage that the user may know that the system has a logging function, but it is more difficult for the user to find the logging and to determine what is being logged. Further, the messages are obscured by encryption to make the content of the logged messages unintelligible without a decrypting key.

The present invention includes a secure logger package which provides a secure keypair build utility, a secure logger function, a secure logging user run-time utility function and a secure logfile view support runtime utility. The secure keypair build facility generates a keypair (a private key and a public key), where the public key is then hashed and the public key and the hash are then written into the header of the source code for the product. The secure logger function then uses the public key to encrypt a symmetric key which symmetric key is used to encrypt the messages.

The secure logger package presents software that makes it difficult to determine what is being logged, when it is logged, and the relationship of the logging to any protected DRM actions taken by the tamper-resistant software. The preferred method of operation involves the log being copied and delivered to a remote and trusted processor where the keys are determined and the contents of the trace log decrypted so that notable events from recent operation of the securing processing system can be recovered, leading to information about the operation of the secure processing system.

Other objects and advantages of the system and method of the present invention will be apparent to those skilled in the art in view of the detailed description of the preferred embodiment and the discussion that follows.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
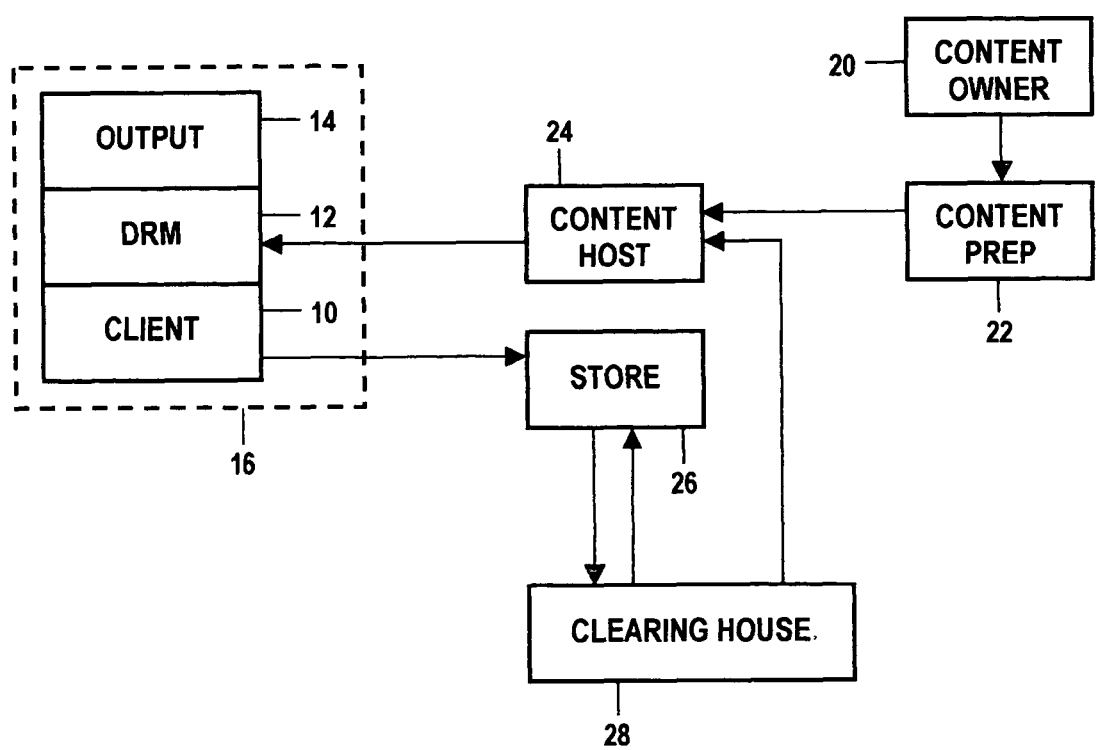
FIG. 1 is a block diagram for a digital rights management system, an understanding of which is useful for the understanding of the present invention.

FIG. 1 shows a block diagram of a system in which a digital rights management system is functioning. As shown in this view, a client 10 includes a digital rights management (DRM) system 12 and a rendering system (or device) 14 along with a protected processing environment 16 that is indicated through the use of a dotted line. The client 10 may be a specialized device or may be a general-purpose data processing device such as a personal computer, such as an IBM ThinkPad. The digital rights management system includes a portion of code running in the client 10 to receive protected digital content along with additional information such as keys and permissions as described in the above-identified DRM Patent. When a user at the client 10 desires to use some of the digital content (which content might be audio content such as music, audiovisual material such as a movie, or visual content such as electronic books, or some combination of these types of materials) which are stored on his machine, he uses his DRM system 12 to identify the material desired. The DRM system then determines whether the identified content is subject to usage conditions (such as types of usage, duration of usage, number of uses, etc.) and whether the usage conditions are met (that is, if the content is subject to use for only a finite period of time, determining whether the present time is within the finite time period). If the usage is permitted by the usage conditions that are associated with the material provided, then the content is rendered through the rendering system 14 of the user's system. The rendering system, of course, depends on the type of content which is being used, and might include speakers for audio content and a display or other visual output device (like a television) for video content such as movie or electronic book). The processing of the digital rights management system and the rendering occurs within the protected processing environment 16 to protect the content for snooping or spoofing to obtain the content in the clear.

FIG. 1 also illustrates other components of a digital rights management system to illustrate the preparation and processing of content from a source through its distribution to a user. In the form illustrated, content originates with a content owner or creator 20 who uses content preparation software at a content preparation workstation 22 to prepare his content for use in a digital rights management and distribution system. Once the content has been prepared in a suitable digital format and appropriate information regarding usage has been attached to the content, the content is send to a content hosting site 24. Also, information about the content and the content hosting site is sent to a retailer or electronic "store" 26 as well as a clearinghouse 28. The retailer or electronic store 26 maintains a listing of the materials that are available and the terms under which the materials are available. The clearinghouse 28 receives information about a purchase of content and provides the business aspects of the transaction, namely collection of the revenue through a charge card, account debit or other payment device, accounting for the transaction and providing a history log of the transactions for subsequent accounting and auditing as well as confirmation of transactions with users.

Although FIG. 1 depicts only one client 10, one content prep site 22, one content host 24, one retailer 26 and one clearinghouse 28, a content distribution system could have any number of each included within its domain. That is, any number of clients like the client 10 could exist and any number of content hosts like the content host 24 could exist within the network, as desired. Also, the system could include any number of retailers like the retailer 26, and those retailers could include overlapping selections of content available to users. Any number of clearinghouses like the clearinghouse 28 could also exist, although each retailer might be associated with only one of the clearinghouses. Further, some of the functions could be combined into a single entity. For example, the content prep and content host function could be combined and handled by a single entity. Also, the content host function and the retailer or "store: function could be combined, to allow a retailer to take an order and fulfill it. Further, the function of a clearinghouse could be combined with the retailer function or with the content host function, if desired.

The content prep operation, the content host operation, the retailer and the clearinghouse each may process information in a protected processing environment, if these systems are untrusted and/or there is a need for security of the data, like the protection provided in a secure or protected processing environment. If these sites are secure or protected from observation by software like debugging tools, then they may have use for a system of the present invention for debugging the operation of the software operating within a protected processing environment.

Figure 2:
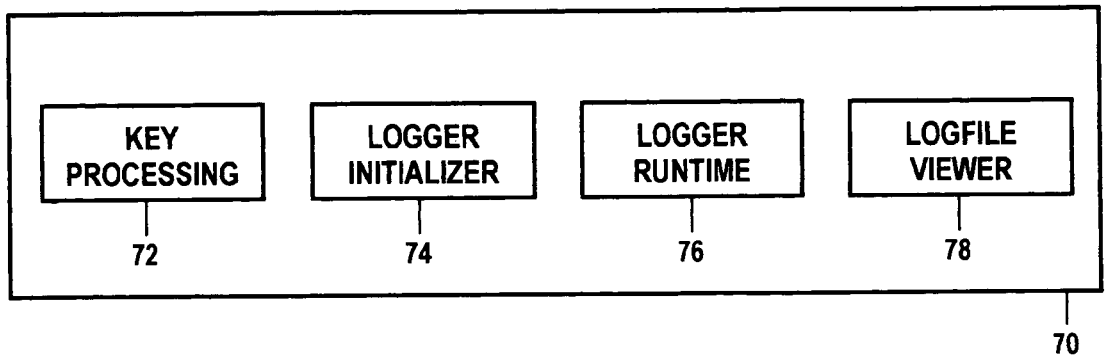
FIG. 2 is a block diagram of a secure logging software package of the present invention that is useful in connection with the digital rights management system of FIG. 1.

FIG. 2 illustrates the several functions of a secure logging software package 70 of the present invention. The secure logging software package 70 includes a key processing module 72, a logger initializer module 74, a logger runtime module 76 and a logfile viewer 78.

Figure 3:
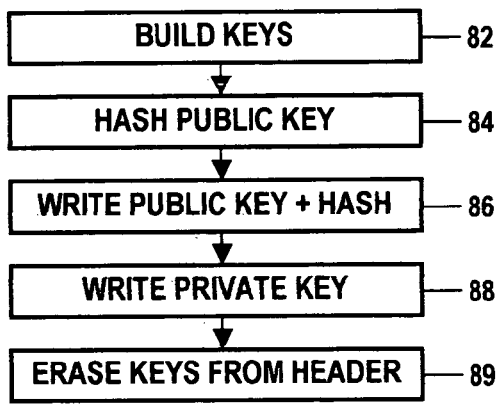
FIG. 3 is a logical flow diagram of key processing, the first element of the secure logging facility shown in FIG. 2.

The operation of the key processing module 72 is illustrated in FIG. 3. First, at block 82, keys are generated for each product build, uniquely associating a security log library with a secure logfile viewer. The public key is hashed at block 84. The public key and the hash are written to the public header file at block 86. The private key is written to a private header file at block 88. The tamper-resistant product and the secure logfile viewer utility are built using the product's normal program preparation process. At block 90 the public.h and private.h header files are deleted, so that a build machine can no longer regenerate the secure logging that is now unique to this tamper-resistant software and logfile viewer build.

Figure 4:
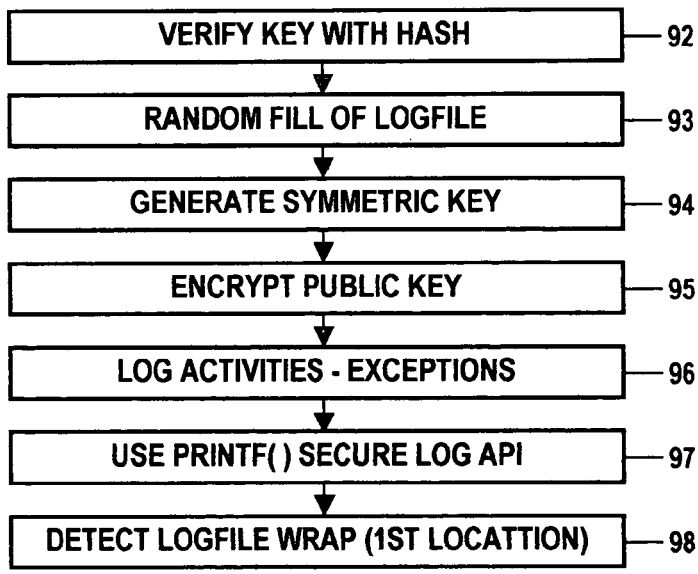
FIG. 4 is a logical flow diagram of the logger initializer, the second element of the secure logging facility shown in FIG. 2.

The operation of the logger initializer module 74 is illustrated in FIG. 4. At block 92 the public key is rehashed and verified against the hash embedded in the logger software. This prevents the public key (if found in the tamper-resistant program file) from being substituted with a known public-key from an attacker's keypair. The log file is filled with random data at block 93. Then, a symmetric key is created at block 94 and is encrypted with the public-key and written to the secure logfile at block 95. The generation of log information of anomalous activities, such as error messages or key indicators, occurs at block 96 and the log information is stored at block 97 using a printf( )-like function to securely store the log information in the logfile The printf( )-like api allows for the convenient interfacing of secure logging to the application programmers' code. In addition, an unhandled exception handler is registered to log the processor's state information (address of exception, registers, stack values, etc.) at the abnormal termination of the tamper-resistant software. The routine printf( )-like logging of normal program execution (as well as secure operations that are would never normally be traced), combined with abnormal termination exception handling, provide an accumulation of information useful for effective diagnosis of a program problem(s). At block 98, the logfile wrap is detected and allowed to "wrap" the storage of log information from the bottom of the logfile to the top, effectively making the log file continuous and of a constant size.

Figure 5:
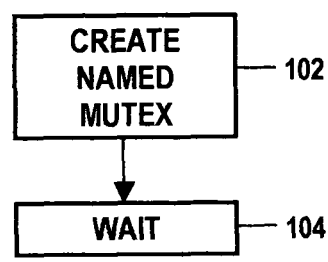
FIG. 5 is a logical flow diagram of the logger runtime, the third element of the secure logging facility shown in FIG. 2.

The operation of the logger runtime module 76 is illustrated in FIG. 5. As shown in this Figure, the process includes a named mutex required to have been created before the secure logfile is produced. The utility is shipped with the product and executed on directions by the product support personnel. The creation of a kernel object (like a named mutex) allows a stand-alone program such as the logger runtime module to signal our tamper-resistant software that it should change its default behavior (and begin secure logging). Although this actually produces a weakness in the tamper-resistance of the software, its convenience and obscurity prompted its inclusion. Without such a switch, logging is always operational and its function could be detected and abused by an attacker. With knowledge of the switches existence, an attack may be able to locate the switch, activate its function, and have a more thorough knowledge of the secure logging done by the tamper-resistant software. As stated above, the program to create the mutext, and activate secure logging in the product, will only be revealed to an end-user by product support after normal problem reporting does not make them suspect of tampering.

Figure 6:
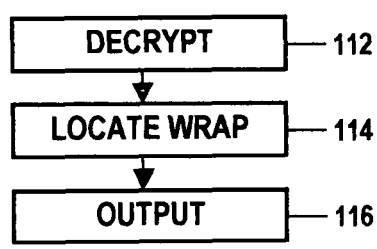
FIG. 6 is a logical flow diagram of the logfile viewer function, the fourth element of the secure logging facility shown in FIG. 2.

The operation of the logfile view module 78 is illustrated in FIG. 6. It is intended that such a file be retained at a central or trusted location and used by the product owner to debug or otherwise analyze the operation of the software within the secure processing environment. In this situation, the file is decrypted at block 112, the wrap location is determined at block 114 and output is created in clear test at block 116.

Throughout this document, the reference to a secure processing environment has been made with the understanding that those skilled in the relevant art are aware of the techniques which are used to prevent observation and tampering with software operating in a secure processing environment. These techniques may vary from application to application, but are generally understood to be techniques that prevent or make it more difficult to watch the operation of the software, e.g., by using trace or debugging software. It is well known that such techniques also include other protections which are not disclosed in the interest of making the software more secure at resisting an attack but not providing a more detailed road-map of the protections which are provided and which must be circumvented in order to attack the software and its protection scheme.

Figure 7A:
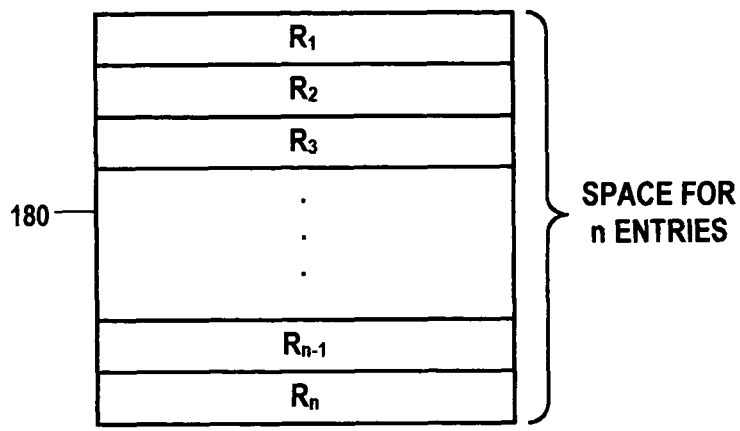
FIG. 7a is a chart depicting one embodiment of the output of the secure logging function (a trace log) as it is first created.
Figure 7B:
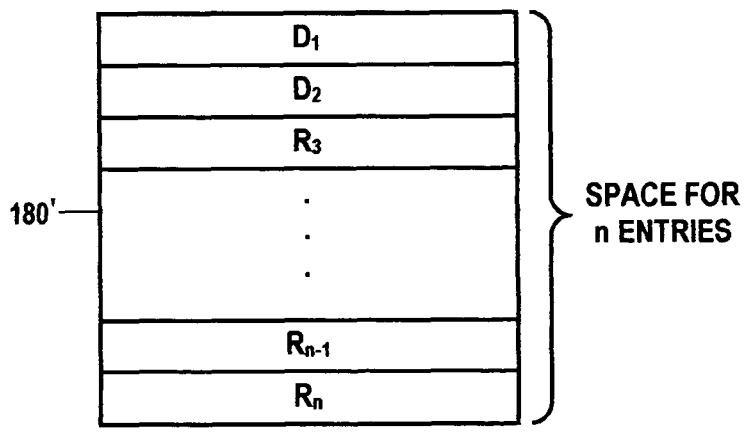
FIG. 7b is a chart depicting the trace log of FIG. 7a after several transactions have been included in it.
Figure 7C:
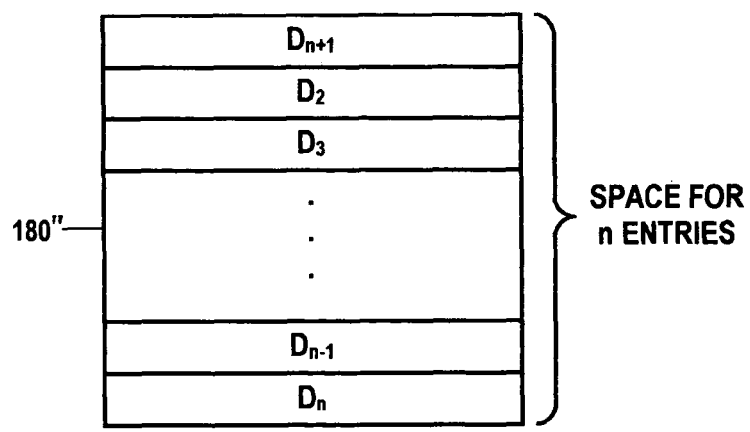
FIG. 7c is a chart depicting the trace log of FIG. 7b after a number of transactions have been recorded it in, causing the storage to "wrap around" and begin filling from the top again.

FIGS. 7a, 7b and 7c are views of the logfile created at different times in accordance with the present invention. An initial logfile 180 is created at the beginning of operation with random data is shown in FIG. 7a. A series of n entries are created to fill the n spaces in the initial logfile 180 with random data R1, R2, R3, . . . Rn−1, Rn.

In FIG. 7b, a log file 180' after two entries are prepared is shown. This logfile 180' is shown with data entries D1 and D2 and the remainder of the file remains filled with the random data R3 . . . Rn−1, Rn which was shown in connection with FIG. 7a. The data added at each location is the encrypted data of the message to be logged. Once encrypted, this data appears as random bytes, indistinguishable from the surrounding bytes in the logfile.

The event logging continues using the logfile 180 (and 180') of the prior FIGS. 7a and 7b until the event logging reaches the log of event n where the file is now full of data entries which have been written over (replacing) the original random data entries. When event n+1 has been recognized, the logging proceeds to wrap, or begin at the beginning of the logfile, overwriting a new data entry Dn+1 over data entry D1. This process is shown in the FIG. 7C which is the result of writing the data entry Dn+1 in the place of data entry D1 in FIG. 7b. Thus, the logfile 180" of FIG. 7c includes data entries Dn+1, D2, D3 . . . Dn−1, Dn in that order and data entry D1 (which was the oldest entry in the logfile has disappeared and is lost. In this way, the logfile includes a log of the n latest events after at least n event have been recognized, and all are in encrypted form. In this way, it might be said that the data from the log file "wraps" around to fill from the top when the file has been completely filled with data, making this a system in which the oldest piece of log information is replaced by the newest piece. A block cipher is useful in allowing the seamless encryption in place of data from a log message that has now wrapped within the file.

It may be a challenge to determine where the last event was recorded, in view of this wrap function. In that case, there are several useful techniques that can be used to identify the last written event. One way is to include a pointer either to the last event written (so that the pointer then is incremented before writing the next event), or to the location Y in which the next event will be written (where the last recorded event will be in location Y−1 unless Y is 1 where the last location n in the logfile was the last one written.) Another approach is to include a "dummy" entry of "next item" in the log file, where each entry is made in place of the "next entry" item and then the "next entry" label is applied to the next location in the logfile.

By using the system shown in FIG. 7, the log file remains of a size for n entries, which means that the logfile remains substantially the same size at all times (while, in its preferred form the log file would remain at the size established for it when the program was created, a file which grows or shrinks slightly during operation, for example, by accommodating a fixed number of messages of where the messages vary in size, remains within the spirit of the present invention). The logical length of the file is allowed to vary, and is only discernable when the logfile is securely decrypted. In this case, the physical logfile appears to be the size of n entries, even when it has no real entries (upon creation in FIG. 7a) or when it has two entries (in FIG. 7b) or when n+1 entries have been created and the file includes the last n entries (in FIG. 7c). However, this would differ from a normal log file that starts at a small size before the logging starts and grows as the logging continues. Such a log file keeps growing larger as the logging continues, giving evidence of a new logged transaction (data being logged) by looking at the file before and after, whereas the system of the present invention does not show a change in size whether a transaction has occurred and logging has happened or not.

Figure 8:
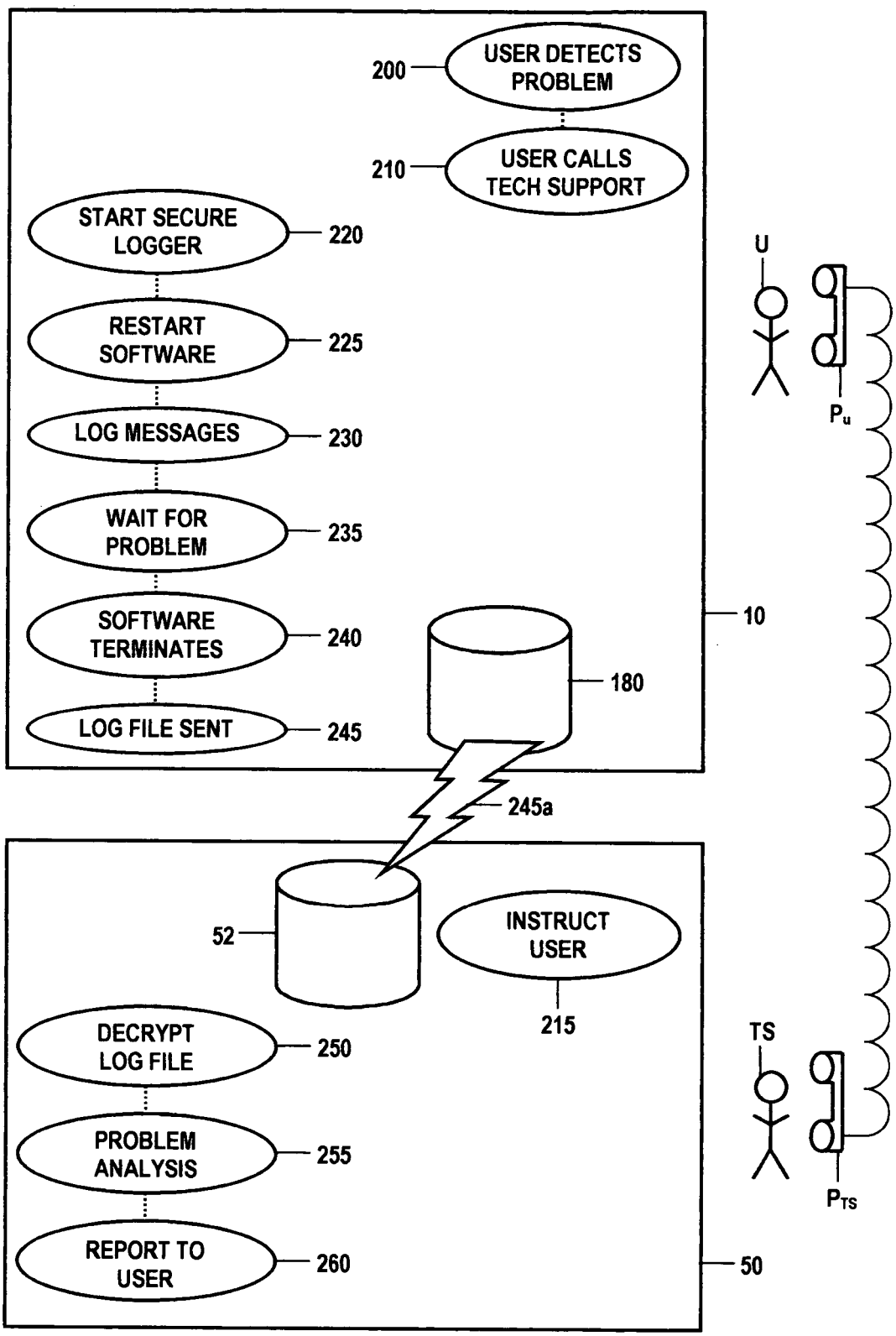
FIG. 8 is a flow chart of the process of operating the secure logging function in the context of a digital rights management system of the present invention shown in FIG. 1.

FIG. 8 illustrates how the secure logging function of the present invention operates in one embodiment. A user U has his client computer 10 on which a secure processing environment is imposed through software such as a digital rights management system as described in connection with other parts of this document and particularly FIG. 1.

As shown in this FIG. 8, the user U detects a problem at step 200 which depicts actions of different entities, generally in accordance with the notations and formats of the Universal Modeling Language (UML) from the standards activity known as CORBA. The user then contacts (at step 210) his tech support personnel TS using his phone Pu to contact the phone Pts of the tech support operation, a facility which is often operated by or for the developer of the software involved. At step 215, the tech support personnel TS instructs the user on how to invoke the secure logging function at the user's client computer 10. The steps the user undertakes are starting the secure logger at step 220, restart the tamper resistant software at step 225, log messages from the secure logger at step 230, wait for the problem to recur at block 235, then the software terminates at block 240 (either through a failure or through a user action). The log file 180 is then sent at step 245 from the user's storage on the client computer 10 to the storage 52 of the computer 50 which is associated with tech support personnel TS. The tech support functions then decrypt the log file at block 250, do problem analysis at block 255 and report the results to the user (either an identification of the problem, a resolution or that the problem could not be determined) at block 255.

Of course, many modifications of the present invention will be apparent to those skilled in the relevant art in view of the foregoing description of the preferred embodiment, taken together with the accompanying drawings. For example, the trace software may be activated in any known manner, such as recognition of an error or in response to an operator determining that the data processing needs to be traced or even by a continuous recording of unusual events such as error messages, unintended software failures or indications of unusual activity, such as failures to perform a decryption step, an attempt to perform an proscribed activity such as attempting to copy material which is marked do not copy. Many other modifications can also be made to the preferred embodiment without departing from the spirit of the present invention. For example, different ways of identifying where in the logfile the last entry was made have been indicated, although these are not exhaustive and other approaches might be used, if it is important to identify which was the last entry made (if that is important to know). Further, some of the features of the present invention can be used without the corresponding use of other features. Additionally, some elements of the preferred embodiment disclosed herein may be performed in a different manner. For example, the key building process has been discussed in connection with use of public key encryption software from RSA which is useful in creating public/private key sets; however, there are other methods of creating similar encryption functions using the public key approach, and other software techniques might be used in which some encryption other than public key might be used to advantage. Accordingly, the foregoing description of the preferred embodiment should be considered as merely illustrative of the principles of the present invention and not in limitation thereof.

Further, the present invention has been described in the context of a method and system for accomplishing the secure logging and allowing the analysis. The present invention might be considered as software which includes sets of programming to accomplish these functions or even as a service which provided the analysis of code which has been generated using the techniques described in the foregoing description and illustrated in the accompanying drawings. The present invention has also been described in the context of a software program to provide the functions indicated, functions which are well known to those skilled in the art. These functions may be provided in the form of software in any convenient programming language, the selection of which is not particularly relevant to the present invention. One or more aspects of the present invention could be implemented in hardware, if desired, or in some combination of hardware and software, if desired. The present invention has also described the process of transmitting information from a user's system to a central debug facility, a function which has not been described in detail because the present invention is not particularly dependent on the type of communication which is employed to achieve this function. Thus, the file could be transmitted alone or in combination with other material (to further obscure the location and function of the log file) and the transmission could be achieved through sending a file over a network connection, sending a physical media such as a diskette or CD with the relevant information stored on it, or by printing the file and sending paper which may be input through OCR scanning. In addition, the information from the file could be determined using a concurrent session, if desired. The generation of a log file has also been described in connection with turning it on through a switch-like function in code. This turning on function may be accomplished under operator control, under remote control (from a message from a help desk) or even under program control, as desired, or it may be constantly on and logging events. The function of transmitting the log file, similarly, can be accomplished in response to a user's command, a remote command or a program command, as, for example, when a program abnormally ends or crashes. Given concerns about privacy and security of information, such as protected content, it is believed that it will be desirable in many situations to use a user-initiated logging command and a user-initiated sending of a log file, but these are really design choices and not requirements of the present invention.

Having thus described the invention, what is claimed is:

1. A system that allows analysis of software running in a tamper-resistant environment, the system comprising:
a processor which monitors at least one instance of software execution, wherein the one instance is identified and selected by an end-user to be monitored by the processor, wherein the end-user is a user that initiates execution of the software at a system associated with the end-user, and wherein the processor creates a log entry with at least one set of data derived from the one instance of software execution in response to the one instance being identified and selected to be monitored, whereby the set of data is used to diagnose the software execution;
an encryption system which generates at least one symmetric key and encrypts the log entry for the at least one set of data using the symmetric key, wherein the encryption system encrypts the symmetric key using a public key associated with the encryption system;
a log file of a relatively-fixed size which stores the log entry for the at least one set of data which has been encrypted, and wherein the log file includes the symmetric key which has been encrypted with the public key;
random data in the log file when it is originally created and which is replaced by log entries so that a size of the log file including log entries appears to be a substantially constant size; and
a pointer which identifies a next storage location for a next log entry so that a last log entry can be determined and the next log entry can be positioned in a location in the log file after a previous log entry.

2. A system including the elements of claim 1 wherein the system includes a transmission system for sending the log file, upon command, to a secure processing location away from the system in which the log file was created.

3. A system including the elements of claim 1 wherein the system includes a system for wrapping around and filling the log file from a beginning when the log file has been filled, allowing the log file to remain at a substantially-constant size even after the log file has been filled with data and a new entry is received.

4. A system including the elements of claim 1 wherein the system includes a mechanism for obscuring the log entry which has been created.

5. A system including the elements of claim 4 wherein the mechanism for obscuring the log entry which has been created includes a printing function for writing into the log file.

6. A system including the elements of claim 2 wherein the system includes a mechanism for receiving an indication from a user that transmission is desired and transmits the log file in response to that indication.

7. A system including the elements of claim 1 wherein the system further includes a mechanism for receiving an input from an end-user that initiates logging of log entries into the log file each time logging is desired by the user.

8. A system including the elements of claim 1 wherein the system further includes an initializing mechanism for determining each instance logging is to begin and initiating logging of log entries only in response to that initializing mechanism.

9. A system including the elements of claim 1 wherein the system uses the public key to encrypt the log entry which has been created and a private key corresponding to the public key is used to decrypt the log entry which has been created at a secure location.

10. A method for diagnosing software in a tamper-resistant environment comprising the steps of:
generating a log file full of random data, wherein the log file is of a substantially constant size;
generating at least one symmetric key, wherein the symmetric key resides within the log file;
turning on logging and establishing a pointer for a location of a next logged software operation activity;
monitoring at least one software operation activity within the tamper-resistant environment and generating messages in response to at least one instance of software execution within the tamper-resistant environment, wherein the software operation activity is identified and selected by an end-user to be monitored, wherein the end-user is a user that initiates execution of the software at a system associated with the end-user;

encrypting, in response to the monitoring, a record associated with each generated message using the symmetric key;

encrypting using the symmetric key, wherein a encryption system encrypts the symmetric key using a public key associated with the encryption system;

logging into a log entry into a log file at least one software operation activity relating to a generated message by replacing random data with an encrypted record of the software operation activity;

placing into the log file the symmetric key which has been encrypted with the public key;

moving the pointer when the log entry has been made to a next available log position;

wrapping the pointer to a beginning of the log file when the log file is full of log entries;

sending the log file to a secure location where the log file can be decrypted and analyzed; and analyzing decrypted log file data and providing information for diagnosing software in the tamper-resistant environment.

11. A method including the steps of claim 10 wherein the step of turning on logging includes the steps of receiving a user input indicating that logging is desired and initiating the logging in response thereto.

12. A method including the steps of claim 10 wherein the step of at least one software operation activity further includes the steps of determining whether the software operation activity is to be logged, and if so, determining when to encrypt the software operation activity to obscure what is being logged.

13. A method including the steps of claim 10 wherein the step of logging the software operation activity further includes the steps of determining a next available log position, replacing existing data in the next available log position with data from the software operation activity, and updating the pointer to provide a location of next logged software operation activity.

14. A method including the steps of claim 10 and further including the step of receiving a command from a user that indicates that sending the log file to a remote location is desired and transmitting the log file in response thereto.

15. A method of analyzing the operation of software in a remote protected processing environment, the method including:

receiving from the remote protected processing environment an encrypted log file of substantially-constant size comprising at least one log entry with at least one set of data derived from at least one instance of software execution monitored in response to an end-user identifying and selecting the one instance of software execution, wherein the end-user is a user that initiates execution of the software at a system associated with the end-user, whereby the set of data is used to diagnose the software execution, wherein the set of data within the encrypted log file has been encrypted with at least one symmetric key included within the encrypted log file, and wherein the symmetric key has been encrypted by a public key associated with an encryption system;

determining a decrypting key for the encrypted log file and decrypting the encrypted log file;

determining a private decrypting key corresponding to the public key associated with the system;

analyzing, using the decrypting key and the private decrypting key, the log entry at the remote protected processing environment to determine whether an operation of the remote protected processing environment corresponding to the at least one set of data derived from at least one instance of software execution is appropriate;

reporting results of the analyzing step; and providing an instruction to initiate a logging of messages each time logging is desired by the end-user and an instruction to send to the encrypted log file to a remote system for analysis, wherein the instruction to initiate logging of messages includes the step of initiating programming within the remote protected processing environment to replace information in the encrypted log file with encrypted information relating to the operation of the remote protected processing environment, and wherein the step of replacing information in the encrypted log file includes the step of replacing random data which was placed in the encrypted log file when it was created.

16. A method providing the steps of claim 15 wherein the step of replacing information in the encrypted log file includes the step of using a pointer to a next location in the encrypted log file and the pointer wraps to a beginning of the log file after the encrypted log file has been filled.

17. A non-transitory computer readable storage medium for analyzing software running in a tamper-resistant environment, the computer readable storage medium comprising instructions for:

recording at least one set of data serviced from at least one instance of software execution identified and selected by an end-user to be monitored whereby the set of data is used to diagnose the software execution wherein the end-user is a user that initiates execution of the software at a system associated with the end-user;

generating at least one symmetric key;

encrypting the symmetric key using a public key associated a client computer system encrypting the recording of the at least one set of data using the symmetric key;

recording the at least one set of data, which has been encrypted sequentially in a storage block of a substantially fixed size, wherein the storage block includes the symmetric key which has been encrypted with the public key, wherein the storage block of a substantially fixed size is initialized with random information which has been encrypted to provide a block of apparent data;

maintaining a pointer to a next available location for recording the at least one set of data sequentially in the storage block;

responding to a command and sending an encrypted log file comprising the at least one set of data which has been encrypted and sequentially recoded in the storage block to a remote location for decryption and analysis.

18. The computer readable storage medium of claim 17, further comprising instructions for:

writing the at least one set of data which has been encrypted and recorded in a sequential order in the storage block of the substantially fixed size and for wrapping around when an end of the storage block of the substantially fixed size is reached.

\* \* \* \* \*